(12) United States Patent
Chou et al.

(10) Patent No.: US 11,218,219 B2
(45) Date of Patent: Jan. 4, 2022

(54) BIDIRECTIONAL OPTICAL WIRELESS TRANSMISSION SYSTEM

(71) Applicant: NATIONAL TAIWAN UNIVERSITY OF SCIENCE AND TECHNOLOGY, Taipei (TW)

(72) Inventors: Hsi-Hsir Chou, Taipei (TW); Wei-Ta Huang, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 0 days.

(21) Appl. No.: 17/009,741

(22) Filed: Sep. 1, 2020

(65) Prior Publication Data

US 2021/0075511 A1 Mar. 11, 2021

(30) Foreign Application Priority Data

Sep. 6, 2019 (TW) .................................. 108132288

(51) Int. Cl.
| | |
|---|---|
| *H04B 10/112* | (2013.01) |
| *G02B 27/14* | (2006.01) |
| *H04B 10/25* | (2013.01) |
| *G02B 27/30* | (2006.01) |
| *H04B 10/66* | (2013.01) |

(Continued)

(52) U.S. Cl.
CPC ..... *H04B 10/25891* (2020.05); *G02B 5/1861* (2013.01); *G02B 27/141* (2013.01); *G02B 27/30* (2013.01); *H04B 10/1123* (2013.01); *H04B 10/50* (2013.01); *H04B 10/66* (2013.01)

(58) Field of Classification Search
CPC ................ H04B 10/1123–1125; G02B 27/141
See application file for complete search history.

(56) References Cited

U.S. PATENT DOCUMENTS

| | | | |
|---|---|---|---|
| 2004/0091269 A1* | 5/2004 | Green ................ | H04B 10/1125 398/130 |
| 2008/0260380 A1* | 10/2008 | Ridley ............... | H04B 10/1125 398/41 |

(Continued)

*Primary Examiner* — Nathan M Cors
(74) *Attorney, Agent, or Firm* — Chun-Ming Shih; Lanway IPR Services

(57) ABSTRACT

A bidirectional optical wireless transmission system which at least includes one or more optical nodes and terminals is proposed. While the optical node is composed of an optical transmitter, a first optical receiver and a beam collimator; a spatial light modulator, a passive retroreflector and a second optical receiver are employed by the optical terminal to receive the modulated and unmodulated incident beams, which were transmitted from the optical node simultaneously. In the optical terminal, the modulated incident beams are received by the second receiver and the unmodulated incident beams are reflected and through the spatial light modulator in order to be modulated by the spatial light modulator. These modulated reflected beams from spatial light modulator are returned to the optical node through the optical path parallel to the incident beams and received by the first optical receiver within the optical node. The proposed invention based on the beam steering technique provides an efficiency approach to reduce system weight and power consumption in the scenario of bidirectional optical wireless communications.

6 Claims, 5 Drawing Sheets

(51) Int. Cl.
*G02B 5/18* (2006.01)
*H04B 10/50* (2013.01)

(56) References Cited

U.S. PATENT DOCUMENTS

2010/0303466 A1* 12/2010 Chand ................ H04B 10/1123
  398/115
2014/0079404 A1* 3/2014 Kykta .................... H04B 10/11
  398/128
2015/0160384 A1* 6/2015 Arbabi ................... H04B 10/40
  359/238

* cited by examiner

ID OPTICAL WIRELESS
BIDIRECTIONAL OPTICAL WIRELESS TRANSMISSION SYSTEM

BACKGROUND OF THE INVENTION

1. Field of the Invention

The present invention generally relates to a bidirectional optical wireless transmission system; in particular, it relates to a type of asymmetric bidirectional optical wireless transmission system which can be implemented by means of a spatial light modulator for wavelength separations and modulations and in combination with the wavelength division multiplexing (WDM) and the passive retroreflection technologies.

2. Description of Related Art

The origin of the development regarding to wireless optical communication technologies is to support the technologies and concepts proposed for areas where it is difficult to install optical fibers and enjoy optical fiber broadband networks; that is, there is no need to set up wired media, e.g., optical fibers, cables etc., as the communication media, so it is also referred as Free Space Optical Communication (FSOC).

It is known that the propagation characteristics of light sources having different wavebands when transmitted in transmission channels are not the same, so it is required to select suitable light sources based on different applications and occasions. In general, by categorizing the wavelength characteristics in the selected light source itself, it is simply divided into two types: visible light wireless optical communication systems and invisible light wireless optical communication systems.

The conventional FSOC is symmetric; i.e., both the optical node and the optical terminal need to be configured with devices such as the optical transmitter, beam collimation system, modulator, optical receiver, or the like; however, this may adversely cause the entire system to be very energy-consuming and bulky, making it difficult to lighten the system, and also because of the laser collimation issue, such systems are inconvenient with regard to their movability. Therefore, a kind of modulating retro-reflector (MRR) has been developed. But, it should be understood that traditional MRR can only perform uni-directional transmissions.

Consequently, to resolve the aforementioned issues, the present invention allows to reconfigure the output beam widths and positions of the incident beams, such that, after the optical node transfers the unmodulated beam toward the optical terminal, the optical terminal can perform modulations thereon and then send data back to the optical node. As a result, the optical terminal is not required to be configured with optical transmitter or beam collimation system. Accordingly, the system can be effectively lightened and exhibit reduced energy-consumption feature, thus achieving the goal of the asymmetric bidirectional optical wireless transmission system nodes. Hence, the present invention can demonstrate an optimal solution.

SUMMARY OF THE INVENTION

A bidirectional optical wireless transmission system according to the present invention is disclosed, comprising: one or more optical nodes, including: an optical transmitter, capable of transmitting incident beams having one or more modulated beam sets containing signals and one or more unmodulated beam sets, in which the modulated incident beams having signals and the unmodulated incident beams respectively have different wavelength ranges; one or more first optical receivers, applied to receive a reflected beam which is a beam having modulated signals; a beam collimator, installed on one side of the optical transmitter in order to perform collimation adjustments on the beams emitted by the optical transmitter; one or more optical terminals, installed on the optical traveling path of the incident beam in order to receive the incident beam emitted by the optical node, and including: a spatial light modulator, capable of enabling different diffraction angles via the periodic structure composed of multiple pixels thereby separating multiple sets of incident beams; a passive retroreflector, installed on one side of the spatial light modulator and including a first lens, a wavelength selection unit and a diffraction component, in which the incident beams can pass through the first lens to enter into the spatial light modulator, and the separated incident beams through the spatial light modulator can enter into the wavelength selection unit of the passive retroreflector such that the modulated incident beams having signals can pass, while the unmodulated incident beams travel toward the spatial light modulator; one or more second optical receivers, installed on one side of the passive retroreflector thereby receiving the modulated incident beams having signals; wherein, after the unmodulated incident beams pass through the spatial light modulator, it is possible to modulate a reflected beam having signals which then travels through the first lens and along the optical path parallel to the incident beams such that the reflected beam can return to the optical node and be received by the first optical receiver.

More specifically, the above-said spatial light modulator is a programmable diffraction component which may be a silicon-based liquid crystal component, a liquid crystal component or a micro-electromechanical system.

More specifically, the above-said wavelength selection unit is a splitter.

A bidirectional optical wireless transmission system according to the present invention is disclosed, comprising: one or more optical nodes, including: an optical transmitter, capable of transmitting incident beams having one or more modulated beam sets containing signals and one or more unmodulated beam sets, in which the modulated incident beams having signals and the unmodulated incident beams respectively have different wavelength ranges; one or more first optical receivers, applied to receive a reflected beam which is a beam having modulated signals; a beam collimator, installed on one side of the optical transmitter in order to perform collimation adjustments on the beams emitted by the optical transmitter; one or more optical terminals, installed on the optical traveling path of the incident beam in order to receive the incident beam emitted by the optical node, and including: a second lens; a spatial light modulator, installed between the beam collimator of the optical node and the second lens, in which the incident beam can pass through the spatial light modulator such that the incident beam can be reflected to pass through the second lens by means of the spatial light modulator, and the spatial light modulator can enable different diffraction angles via the periodic structure composed of multiple pixels thereby separating multiple sets of incident beams; a passive retroreflector, installed on one side of the spatial light modulator and including a third lens and a wavelength selection unit, in which, after the incident beams passing through the spatial light modulator pass through the third lens, the incident beams can enter into the wavelength selection unit such that the modulated incident beams having signals can pass, while the unmodulated incident beams travel toward the spatial light modulator; one or more second optical receivers, installed on one side of the passive retroreflector thereby receiving the modulated incident beams having signals; wherein, after the unmodulated incident beams pass through the third lens, the second lens and the spatial light modulator, it is possible to modulate a reflected beam having signals which then travels through the first lens and along the optical path parallel to the incident beams such that the reflected beam can return to the optical node and be received by the first optical receiver.

More specifically, the above-said spatial light modulator is a programmable diffraction component which may be a silicon-based liquid crystal component, a liquid crystal component or a micro-electromechanical system.

More specifically, the above-said wavelength selection unit is a splitter.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
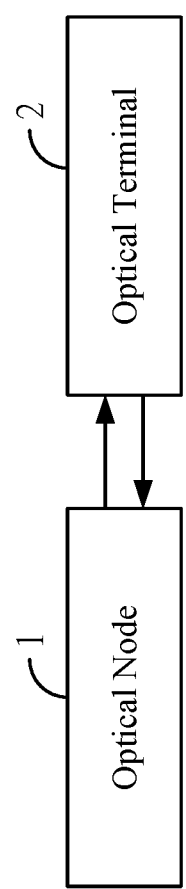
FIG. 1 shows an overall architecture view of the bidirectional optical wireless transmission system according to the present invention.
Figure 2:
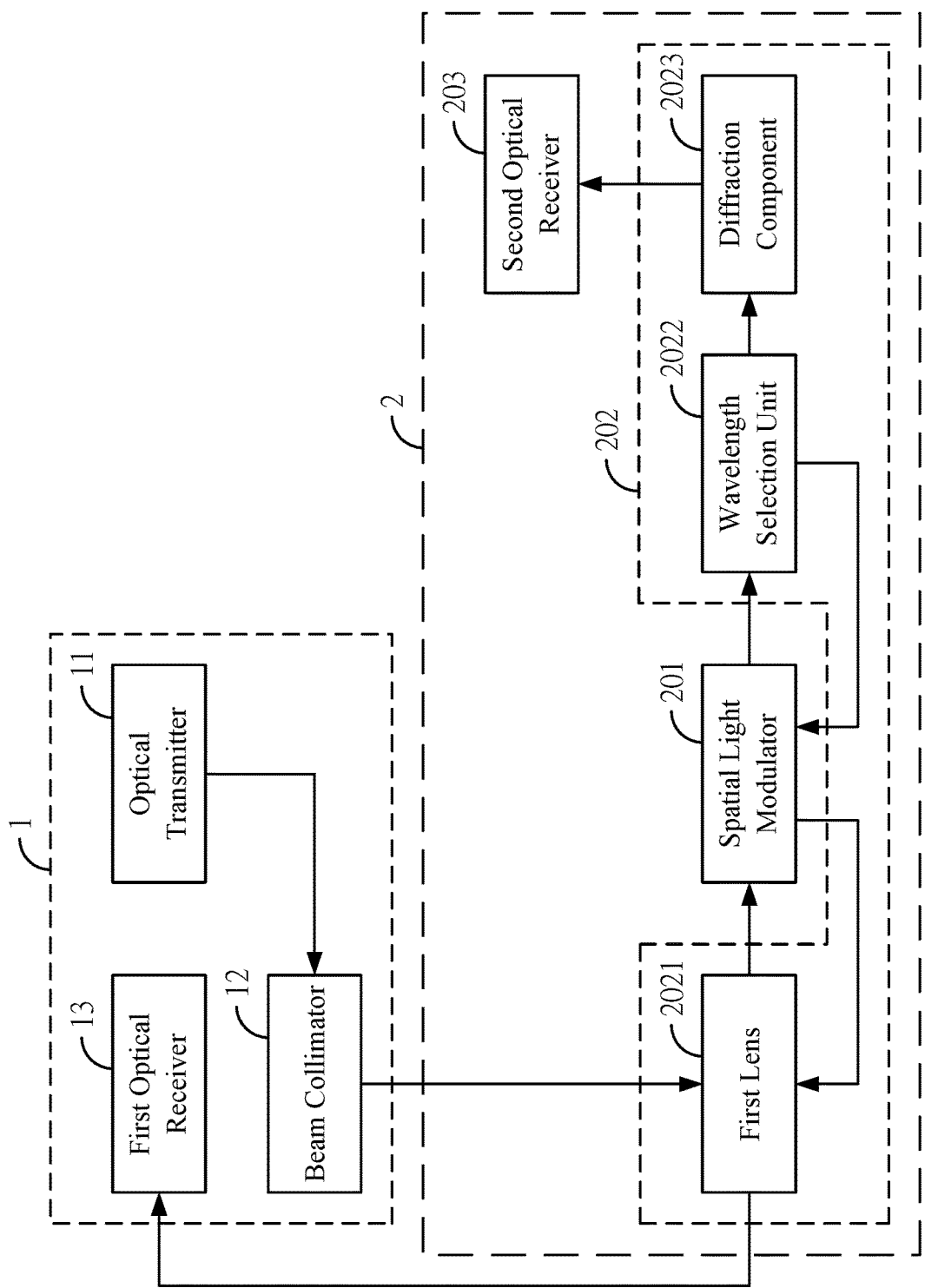
FIG. 2 shows an architecture view for a first embodiment of the bidirectional optical wireless transmission system according to the present invention.
Figure 3:
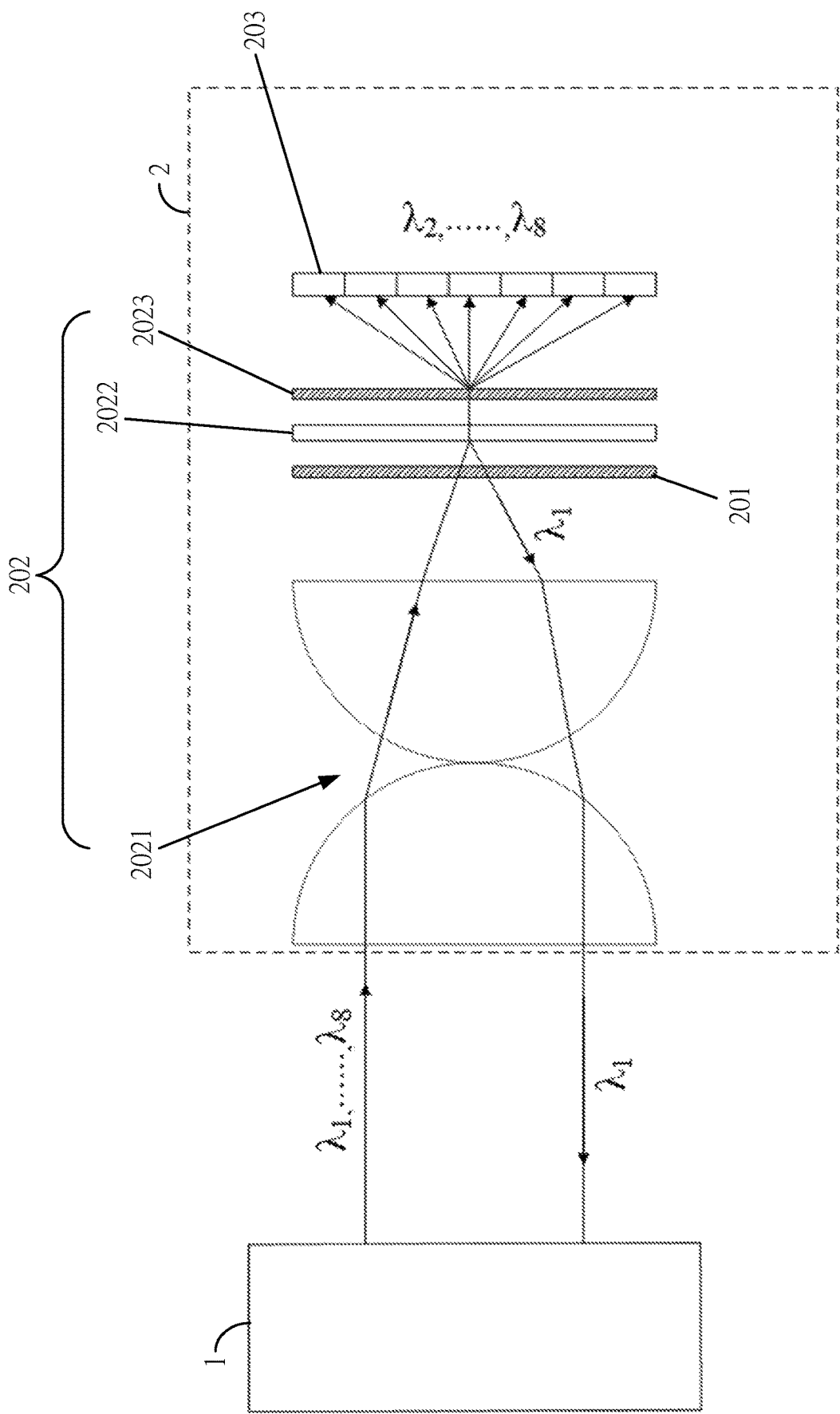
FIG. 3 shows an actual design view for the first embodiment of the bidirectional optical wireless transmission system according to the present invention.

As shown in FIGS. 1-3, the illustrated bidirectional optical wireless transmission system according to the present invention comprises one or more optical nodes 1 and one or more optical terminals 2, wherein the optical node 1 includes an optical transmitter 11, a first optical receiver 13 and a beam collimator 12, in which the optical transmitter 11 is capable of transmitting incident beams having one or more modulated beam sets containing signals and one or more unmodulated beam sets to travel through the beam collimator 12, and the modulated incident beams having signals and the unmodulated incident beams respectively have different wavelength ranges, such that the beams emitted by the optical transmitter can be collimated and adjusted to enter into the optical terminal 2.

Herein the optical terminal 2 is installed on the optical traveling path of the incident beam in order to receive the incident beam emitted by the optical node 1. The optical terminal 2 includes a spatial light modulator 201 (e.g., a programmable diffraction component which may be a silicon-based liquid crystal component, a liquid crystal component or a micro-electromechanical system), a passive retroreflector 202 and a second optical receiver 203, wherein the passive retroreflector 202 includes a first lens 2021 (it should be noticed that although the lens used in the present invention is the Telecentric Lens, other types of lens are also applicable), a wavelength selection unit 2022 (e.g., Dichroic Mirror, splitter), and a diffraction component 2023 (which is a grating in the present invention).

It should be appreciated that the aforementioned programmable diffraction component (i.e., a silicon-based liquid crystal component, a liquid crystal component or a micro-electromechanical system) is configured in order to modify the light path and also further adjust the period of the programmable diffraction component thereby enabling multi-wavelength selection and switching features.

The spatial light modulator 201 is installed on one side of the first lens 2021, so that the incident beam can pass through the first lens 2021 to enter into the spatial light modulator 201, wherein the spatial light modulator 201 can combine with the diffraction component 2023 to allow different wavelengths to have different diffraction angles via the periodic structure composed of multiple pixels thereby separating multiple sets of incident beams.

Then, the incident beams separated by the spatial light modulator 201 can enter into the wavelength selection unit 2022 of the passive retroreflector 202 such that the modulated incident beams having signals (e.g., wavelength $\lambda_{2-8}$) will pass, while the unmodulated incident beams (e.g., wavelength $\lambda_1$) will travel toward the spatial light modulator 201.

After the modulated incident beams having signals (wavelength $\lambda_{2-8}$) go into the diffraction component 2023, it is possible to separate different wavelengths by means of the diffraction component 2023 such that the modulated incident beams having signals (wavelength $\lambda_{2-8}$) can be further respectively transferred to different reception ends in the second optical receiver 203.

On the other hand, after the unmodulated incident beams (wavelength $\lambda_1$) pass through the spatial light modulator 201, it is possible to modulate a reflected beam having signals which then travels through the first lens 2021 and along the optical path parallel to the incident beams such that the reflected beam can return to the optical node 1 and be received by the first optical receiver 13.

In the present invention, it can be seen that the optical transmitter is not required to be installed in the optical terminal 2; instead, after the optical end 1 transmits the unmodulated incident beams into the optical terminal 2, the unmodulated incident beams can be reflected toward the spatial light modulator thereby modulating a reflected beam having signals which then travels along the optical path parallel to the incident beams to let the reflected beam return to the optical end 1, thus allowing the optical end 1 to enable both transmitting and receiving functions.

In addition, although the embodiment of the present invention merely discloses the reception of a single wavelength (received by the first optical receiver 13), it should be appreciated that one or more optical receivers may be additionally set up thereby achieving the wavelength division multiplexing (WDM) and full duplex functions, which, compared with conventional technologies (an additional set of MRR must be connected in series for each additional wavelength), the costs for required equipments can be significantly reduced.

Moreover, with regard to the above-said first optical receiver and the second optical receiver, in order to receive beams of multiple wavelengths, it is possible not only to install multiple first optical receivers and multiple second optical receivers to receive multiple wavelengths, but the first optical receiver and the second optical receiver may be also configured to have multiple reception ends such that multiple wavelengths can successfully received by means of a single optical receiver (i.e., the first optical receiver and the second optical receiver).

Figure 4:
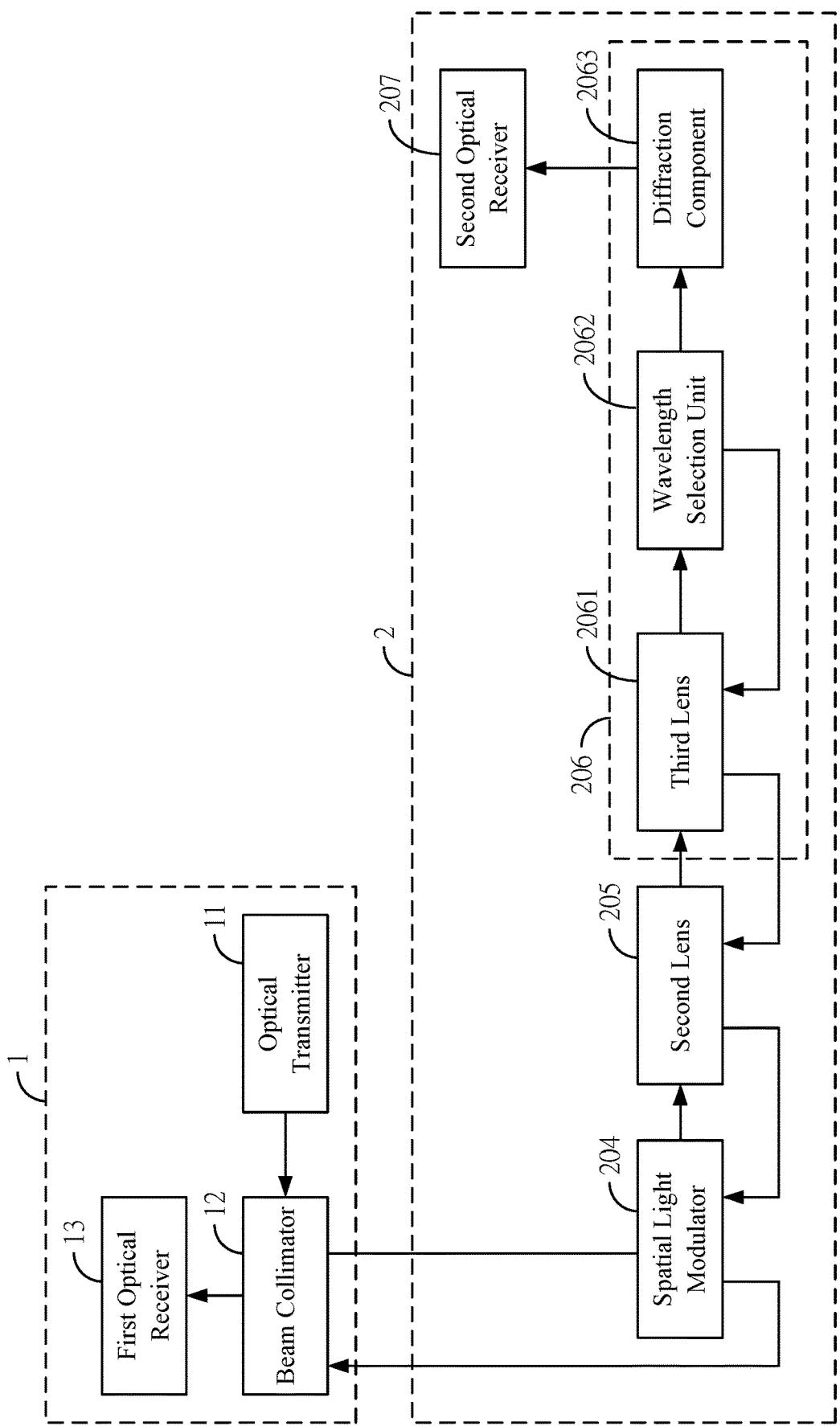
FIG. 4 shows an architecture view for a second embodiment of the bidirectional optical wireless transmission system according to the present invention.
Figure 5:
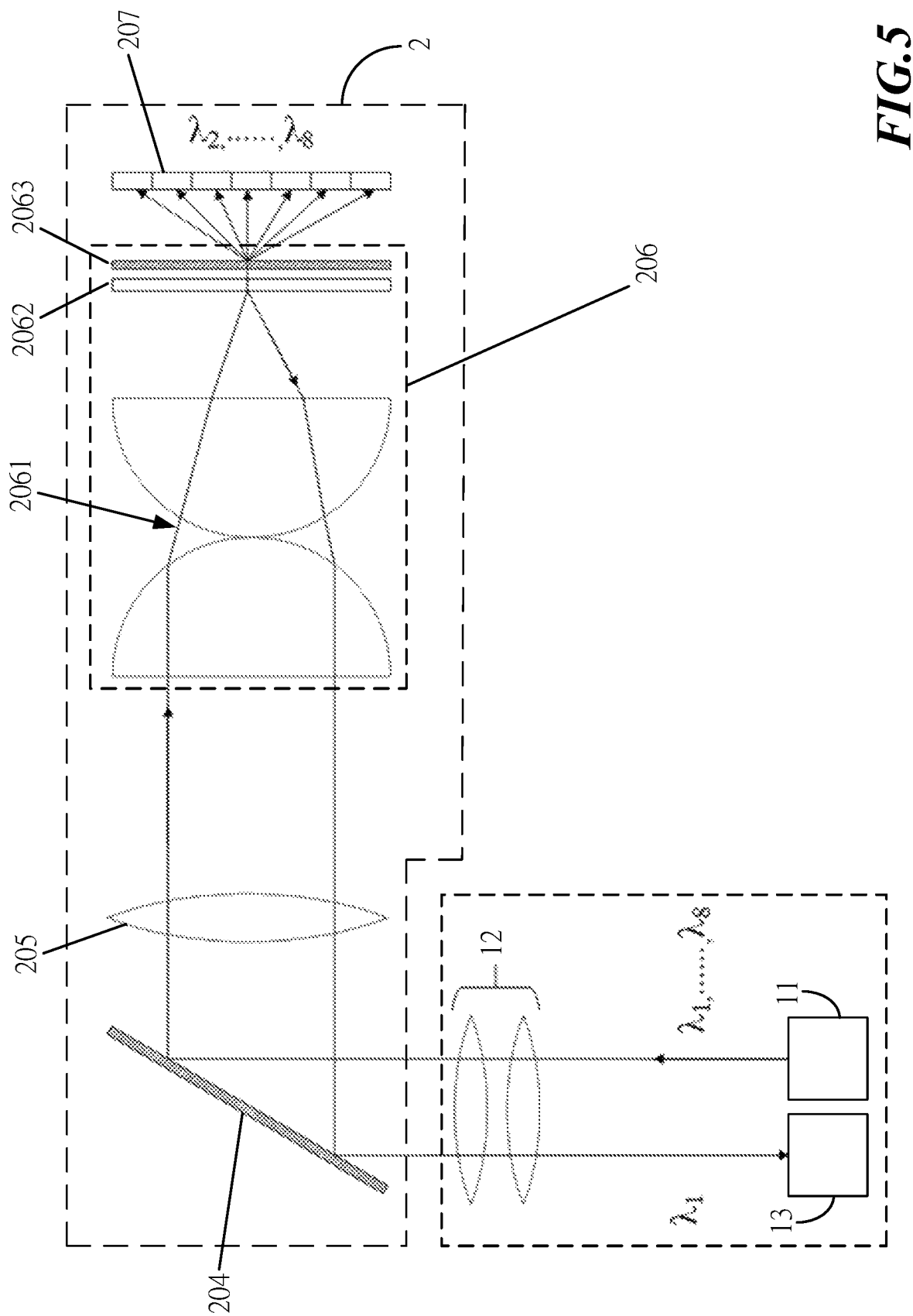
FIG. 5 shows an actual design view for the second embodiment of the bidirectional optical wireless transmission system according to the present invention.

As previously described, in the present invention, it is possible to adopt a transmissive programmable diffraction component based on demand and adjust the period of the programmable diffraction component to enable multi-wavelength selection and switching features; but, in addition to the transmissive programmable diffraction component, the present invention can also apply the reflective programmable diffraction component to achieve the same purpose. In FIGS. 4-5, the architecture views of a second embodiment are shown, which differs from the previous embodiment in that the architecture of the optical terminal 2 changes; herein the present optical terminal 2 includes a spatial light modulator 204, a second lens 205, a passive retroreflector 206 and a second optical receiver 207, in which the spatial light modulator 204 is a reflective programmable diffraction component, so that, after the incident beams pass through the beam collimator 12, the incident beams can be further reflected to travel through the second lens 205 by means of the spatial light modulator 204 which can enable different diffraction angles via the periodic structure composed of multiple pixels thereby separating multiple sets of incident beams.

Subsequently, the passive retroreflector 206 is installed on one side of the spatial light modulator 204 and includes a third lens 2061 (Telecentric Lens), a wavelength selection unit 2062 (Dichroic Mirror, splitter) and a diffraction component 2063, in which, after the incident beams passing through the spatial light modulator 204 pass through the third lens 2061, the incident beams can enter into the wavelength selection unit 2062 such that the modulated incident beams having signals can pass, while the unmodulated incident beams can be reflected to travel toward the spatial light modulator 204;

After the modulated incident beams having signals go into the diffraction component 2063, it is possible to separate different wavelengths by means of the diffraction component 2063 such that the modulated incident beams having signals (wavelength $\lambda_{2-8}$) can be further respectively transferred to different reception ends in the second optical receiver 203.

On the other hand, after the unmodulated incident beams (wavelength $\lambda_1$) have been reflected to travel and arrive at the spatial light modulator 204 through the third lens 2061 and the second lens 205, it is possible to modulate a reflected beam having signals which then travels through the beam collimator 12 and along the optical path parallel to the incident beams such that the reflected beam can return to the optical node 1 and be received by the first optical receiver 13.

In comparison with other conventional technologies, the bidirectional optical wireless transmission system according to the present invention provides the following advantages:

(1) The present invention allows to reconfigure the output beam widths and positions of the incident beams, such that, after the optical node transfers the unmodulated beam toward the optical terminal, the optical terminal can perform modulations thereon and then send data back to the optical node. As a result, the optical terminal is not required to be configured with optical transmitter or beam collimation system. Accordingly, the system can be effectively lightened and exhibit reduced energy-consumption feature, thus achieving the goal of the asymmetric bidirectional optical wireless transmission system nodes.

(2) The present invention can use the spatial light modulator to perform wavelength separations and modulations, and operate in combination with the wavelength division multiplexing (WDM) and passive retroreflector so as to implement the asymmetric bidirectional optical wireless transmission.

(3) The present invention can use the penetrating or reflective programmable diffraction component based on requirements, and adjust the period of the programmable diffraction component thereby enabling multi-wavelength selection and switching features, which typically general technologies do not provide.

(4) The present invention can be configured with appropriate blazed gratings and the programmable diffractive component, which can divide the wavelength into light division waves of 0.8 nm interval to comply with the DWDM (Dense Wavelength Division Multiplexing) specifications.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alterations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:
1. A bidirectional optical wireless transmission system, comprising:
    one or more optical nodes, including:
        an optical transmitter, transmitting incident beams having one or more modulated beam sets containing signals and one or more unmodulated beam sets, in which the modulated incident beams having signals and the unmodulated incident beams respectively have different wavelength ranges;
        one or more first optical receivers, applied to receive a reflected beam which is a beam having modulated signals;
        a beam collimator, installed on one side of the optical transmitter in order to perform collimation adjustments on the beams emitted by the optical transmitter;
    one or more optical terminals, installed on the optical traveling path of the incident beam in order to receive the incident beam emitted by the optical node, and including:
        a spatial light modulator, enabling different diffraction angles via the periodic structure composed of multiple pixels thereby separating multiple sets of incident beams;
        a passive retroreflector, installed on one side of the spatial light modulator and including a first lens, a wavelength selection unit and a diffraction component, in which the incident beams pass through the first lens to enter into the spatial light modulator, and the separated incident beams through the spatial light modulator enter into the wavelength selection unit of the passive retroreflector such that the modulated incident beams having signals pass, while the unmodulated incident beams travel toward the spatial light modulator;

one or more second optical receivers, installed on one side of the passive retroreflector thereby receiving the modulated incident beams having signals;

wherein, after the unmodulated incident beams pass through the spatial light modulator, a reflected beam having signals is modulated, which then travels through the first lens and along the optical path parallel to the incident beams such that the reflected beam returns to the optical node and is received by the first optical receiver.

2. The bidirectional optical wireless transmission system according to claim 1, wherein the spatial light modulator is a programmable diffraction component which is a silicon-based liquid crystal component, a liquid crystal component or a micro-electromechanical system.

3. The bidirectional optical wireless transmission system according to claim 1, wherein the wavelength selection unit is a splitter.

4. A bidirectional optical wireless transmission system, comprising:

one or more optical nodes, including:

an optical transmitter, transmitting incident beams having one or more modulated beam sets containing signals and one or more unmodulated beam sets, in which the modulated incident beams having signals and the unmodulated incident beams respectively have different wavelength ranges;

one or more first optical receivers, applied to receive a reflected beam which is a beam having modulated signals;

a beam collimator, installed on one side of the optical transmitter in order to perform collimation adjustments on the beams emitted by the optical transmitter;

one or more optical terminals, installed on the optical traveling path of the incident beam in order to receive the incident beam emitted by the optical node, and including:

a second lens;

a spatial light modulator, installed between the beam collimator of the optical node and the second lens, in which the incident beams pass through the spatial light modulator such that the incident beams are reflected to pass through the second lens by means of the spatial light modulator, and the spatial light modulator enables different diffraction angles via the periodic structure composed of multiple pixels thereby separating multiple sets of incident beams;

a passive retroreflector, installed on one side of the spatial light modulator and including a third lens and a wavelength selection unit, in which, after the incident beams passing through the spatial light modulator pass through the third lens, the incident beams enter into the wavelength selection unit such that the modulated incident beams having signals pass, while the unmodulated incident beams travel toward the spatial light modulator;

one or more second optical receivers, installed on one side of the passive retroreflector thereby receiving the modulated incident beams having signals;

wherein, after the unmodulated incident beams pass through the third lens, the second lens and the spatial light modulator, a reflected beam having signals is modulated, which then travels through the first lens and along the optical path parallel to the incident beams such that the reflected beam returns to the optical node and is received by the first optical receiver.

5. The bidirectional optical wireless transmission system according to claim 4, wherein the spatial light modulator is a programmable diffraction component which is a silicon-based liquid crystal component, a liquid crystal component or a micro-electromechanical system.

6. The bidirectional optical wireless transmission system according to claim 4, wherein the wavelength selection unit is a splitter.

* * * * *